(12) United States Patent
McKinsey (10) Patent No.: US 6,463,579 B1
(45) Date of Patent: Oct. 8, 2002

(54) SYSTEM AND METHOD FOR GENERATING RECOVERY CODE

(75) Inventor: Chris M. McKinsey, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/251,560

(22) Filed: Feb. 17, 1999

(51) Int. Cl.[7] .................................................. G06F 9/45
(52) U.S. Cl. ........................ 717/146; 717/145; 717/151
(58) Field of Search ............................. 717/1, 11, 5, 9, 717/7, 8, 100, 124, 131, 136, 140, 145, 151; 712/200, 244; 714/38

(56) References Cited

U.S. PATENT DOCUMENTS

| | | | | |
|---|---|---|---|---|
| 4,667,290 A | * | 5/1987 | Goss et al. ..................... | 717/7 |
| 5,287,510 A | * | 2/1994 | Hall et al. ...................... | 717/9 |
| 5,613,117 A | * | 3/1997 | Davidson et al. .............. | 717/8 |
| 5,655,122 A | * | 8/1997 | Wu .................................. | 717/5 |
| 5,692,169 A | * | 11/1997 | Kathail et al. ............... | 712/244 |
| 5,701,489 A | * | 12/1997 | Bates et al. ..................... | 717/5 |
| 5,778,219 A | * | 7/1998 | Amerson et al. ........... | 712/244 |
| 5,778,233 A | * | 7/1998 | Besaw et al. ................... | 717/9 |
| 5,790,867 A | * | 8/1998 | Schmidt et al. ................ | 717/9 |
| 5,854,928 A | * | 12/1998 | Buzbee .......................... | 717/5 |
| 6,070,009 A | * | 5/2000 | Dean et al. .................. | 717/130 |
| 6,202,204 B1 | * | 3/2001 | Wu et al. ..................... | 717/151 |
| 6,338,133 B1 | * | 1/2002 | Schroter ..................... | 712/214 |

FOREIGN PATENT DOCUMENTS

WO    98/000769    1/1998

OTHER PUBLICATIONS

Data Preload for Superscalar and VLIW Processors, by William Yu–Wei Chen, Jr. Thesis for Doctor of Philosophy in Electrical Engineering, University of Illinois at Urbana–Champaign, 1993.*
Bharadwaj et al, "Wavefront scheduling path based data representation and scheduling of subgraph", IEEE, pp. 262–271, 1999.*
Ranganthan et al, "Using speculative and larger instruction window to narrow the performance gap between memory consistency models", ACM SPAA, pp 199–210.*
Rogers et al, "Software support for speculaive loads", ACM ASPLOS, pp 38–50, 1992.*
August et al, "Integarted predicated and speculative execution in the IMPACT EPIC archiecture" IEEE, pp 227–237, 1998.*

(List continued on next page.)

Primary Examiner—Anil Khatri
(74) Attorney, Agent, or Firm—Schwegman, Lundberg, Woessner & Kluth, P.A.

(57) ABSTRACT

A system and method of compiling source code. A compiler generates intermediate code from the source code, generates object code instructions from the intermediate code and schedules the object code instructions. Object code instructions are scheduled by inserting a speculation check into the object code instructions, storing recovery code associated with the speculation check and generating a control flow graph. The control flow graph is generated by converting the speculation check to a non-flow control check instruction, attaching one or more pseudo instructions to the check instruction and converting the non-flow control check instruction to a flow control check instruction, wherein the pseudo instructions represent recovery code behavior for the recovery code associated with the check instruction.

19 Claims, 8 Drawing Sheets

OTHER PUBLICATIONS

August, D.I., et al., "Sentinel Scheduling with Recovery Blocks", Technical Report CRHC–95–05 Center for Reliable and High Performance Computing, University of Illinois, pp. 1–22, (Jan. 31, 1995).

Chen, Jr., W.Y., "Data Preload for Superscalar and VLIW Processors", Ph.D. Thesis at the University of Illinois at Urbana–Champaign, 118 Pages, (1993).

Gallagher, D.M., et al., "Dynamic Memory Disambiguation Using the Memory Conflict Buffer", *ASPOLS–VI Proceedings*, ,pp. 1–13, (Oct. 1994).

Mahlke, S.A., et al., "Sentinel Scheduling for VLIW and Superscalar Processors", *International Conference on Architectural Support for Programming Languages and Operating Systems*, Published by ACM, New York, USA vol. 27, No. 9, 10 Pages, (Oct. 1992).

August, D.I., et al., "Integrated predicated and speculative execution in the IMPACT EPIC Architecture", *Proceedings of the 25th Annual International Symposium on Computer Architecture*, pp. 227–237, (1998).

Chang, P.P., et al., "Three architectural models for compiler–controlled speculative execution", *IEEE Transactions on computers, 'Online!*, 44 (4), pp. 481–494, (Apr. 1995).

* cited by examiner

```
Global_Schedule(Routine)
{
        Inline_Recovery_Code(Void);
        Global_Schedule(Void);
        Materialize_Recovery_Code(Void);
}

Schedule(Scope)
{
        best ← instruction to schedule
        if (crossing_use(best))
                crossing_chks ← crossing checks of (best)
                value_num ← value_number(best)
                foreach (chk ∈ crossing_chks) do
                        paths ← paths(target) ∩ paths (chk)
                        if (ru ← ValueFound(recuses, best))
                                add paths to ru
                        else
                                recuse ← create new instruction
                                add readers of best to readers of recuse
                                paths(recuse) ← paths
                        fi;
                        if (rd ← ValueFound(recdefs, best))
                                add paths to rd
                        else
                                recdef ← create new instruction
                                add writers of best to readers and writers of recdef.
                                paths(recuse) ← paths
                        fi;
                        if (rc ← ValueFound(rec_database(chk), best))
                                add paths to rc
                        else
                                recinsn ← copy of best
                                add recinsn to rec_database(chk) on paths
                        fi;
                od;
        fi;
```

FIG. 8a elsif (speculative_chk(*best*)) /* checks are never advancing */
 *paths* ← paths(*target*) ∩ paths(*best*)
 if (paths(*target*) ⊇ paths(*best*))
  move *best* to *target*
 else
  move copy of *best* to *target*
  *new_chk* ← rec_database_copy(*best*)
  foreach (*rc* ε recovery_code(*best*)) do
   if (paths(*rc*) ∩ *paths* ≠ ∅ )
    if (paths(*target*) ⊇ paths(*rc*))
     move *rc* to recovery_code(*new_chk*)
    else
     move copy of *rc* to
     recovery_code(*new_chk*)
    fi;
   paths(*rc*) ← paths(*rc*) - paths(*target*)
   fi;
  od;
 fi;
 paths(*best*) ← paths(*best*) - paths(*target*)
 foreach (*ru* ε recovery_uses(*best*)) do
  if (paths(*ru*) ∩ *paths* ≠ ∅ )
   if (paths(*target*) ⊇ paths(*ru*))
    move *ru* to *target*
   else
    move copy of *ru* to *target*
   fi;
   paths(*ru*) ← paths(*ru*) - paths(*target*)
  fi;
 od;
 foreach (*rd* ε recovery_defs(*best*)) do
  if (paths(*rd*) ∩ *paths* ≠ ∅ )
   if (paths(*target*) ⊇ paths(*rd*))
    move *rd* to *target*
   else
    move copy of *rd* to *target*
   fi;
   paths(*rd*) ← paths(*rd*) - paths(*target*)
  fi;
 od;

FIG. 8b

SYSTEM AND METHOD FOR GENERATING RECOVERY CODE

FIELD OF THE INVENTION

The present invention is related to computer programming, and more particularly to the use of recovery code to recover from incorrect speculation.

BACKGROUND INFORMATION

Even as processor speeds increase into the gigahertz range, there is an increased realization that speed alone will not provide adequate performance. Designers are therefore turning to processor architectures which execute two or more instructions per clock cycle (IPC). Superscalar processors and very-long-instruction-word (or VLIW) processors are two examples of processors capable of executing two or more instructions per clock cycle.

Compilers can be designed to exploit efficiencies inherent in a processor having an IPC of greater than one. For instance, a compiler may search during compile time for instructions which can be executed in parallel and may even reorder instructions within the program to enhance parallel execution. Sometimes, the compiler may speculate as to a control path (control speculation) or a data value (data speculation). In these cases, the compiler should provide a way to recover from incorrect speculation.

One approach to recover from compiler-controlled speculation is to provide a recoverable interval of instructions in the object code (called "recovery code") for the processor to execute in the case of failed speculation. This interval of instructions is essentially a copy of the thread of computation which was previously executed speculatively. This implies that the compiler must update the instructions in this recovery code as it speculates loads and their subsequent uses. The bookkeeping for this task is further complicated in that not all uses of a speculative load may execute speculatively. Adding recovery code also complicates optimization in that it adds control flow to the optimization scope. This may prove too difficult or expensive to update for many optimizations since dependence information is built atop control flow information.

One such recovery approach can be described as consisting of two phases. The first phase is during scheduling when a load is speculated. The successors of the load are visited in topological order computing a live-set of values which may be upwards exposed uses in the recoverable interval. These are those values that will be live into the recovery code for the load's recovery check. This is conservative in that it assumes that all uses of the speculative value will move above the check.

Such an approach can lead to poor performance. For instance, in the case of the following conservative line interval calculation:

ld.a r32=
chk.a r32,
ld r34=[a]
add r33=r34,r32 the load of "r32" speculates and leaves a check behind. (In this example, "ld" is a load instruction, "ld.a" is a speculative load instruction and "chk.a" is a check on the speculative load instruction.) The successors of the load are visited and the live-set of the recovery interval is computed. In this case the "add r33=r34,r32" adds the value "r34" to the live-set of the check. Since "r34" is now live into the check, the "ld r34=[a]" can not move above the check because of a write-live dependence.

The second major phase involves generating the recovery for each check after instruction scheduling is completed. The speculative chains are identified and the flow dependencies are followed, adding instructions to the recovery code as each instruction is visited which topologically precedes the speculative load check. One major problem with generating recovery code in this manner is that it is difficult to combine control checks without effecting the schedule.

Another recovery code approach is described by William Yu-Wei Chen, Jr. in his Ph.D. thesis entitled *Data Preload for Superscalar and VLIW Processors*, University of Illinois at Urbana-Champaign, 1993. Chen teaches that a memory conflict buffer (or MCB) can be used to track and correct cases where a load from a memory location is moved above a store to the same location. In one approach, a conflict bit is associated with each general purpose register. At each preload, the location from which the preload is read is stored into an address register corresponding to the destination register of the preload. On a store, a comparison is made to the addresses stored in each of the address registers. If there is a match, the conflict bit corresponding to the general destination register is set. A subsequent check instruction notes the conflict bit and branches to the recovery code.

Neither of the approaches described above addresses the problem of handling recovery code coming to the instruction scheduler from other phases in the compiler. That is, if an earlier phase of compilation were to also exploit hardware based speculation and construct recovery code, the scheduler cannot simply reconstruct all recovery code from scratch (i.e. it must honor the recovery code which came to it). This can be complicated by the fact that an instruction scheduler's local analysis may not be able to determine the extent of a speculative lifetime and the relationships between subsequent uses. In other words, local analysis might not be aware of when a use of a speculative value is crossing a check that checks the use's operands. An example is shown below for a local lifetime analysis code fragment:

ld.a r32=
add r33=1,r32
while (! change) do
  ld r34=
  chk.a r32, rec 1
  xor r35=r33,r34
od;

Since most instruction schedulers would not include the loop region and the region outside of the loop together, an instruction scheduler would only include the entire loop body as a single region at best. Because of this, it is difficult to know that the "xor" inside the loop is reading a speculative value that is being checked by the "chk.a r32" before it.

What is needed is a system and method for dynamically creating and updating control and data speculative recovery code during more than one phase of compilation, including the instruction scheduling phase.

SUMMARY OF THE INVENTION

According to one aspect of the present invention, a system and method of compiling source code is described which generates intermediate code from the source code, generates object code instructions from the intermediate code and schedules the object code instructions. Object code instructions are scheduled by inserting a speculation check into the object code instructions, storing recovery code associated with the speculation check and generating a control flow graph. The control flow graph is generated by converting the speculation check to a non-flow control check instruction, attaching one or more pseudo instructions to the check instruction and converting the non-flow control check instruction to a flow control check instruction, wherein the pseudo instructions represent recovery code behavior for the recovery code associated with the check instruction.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
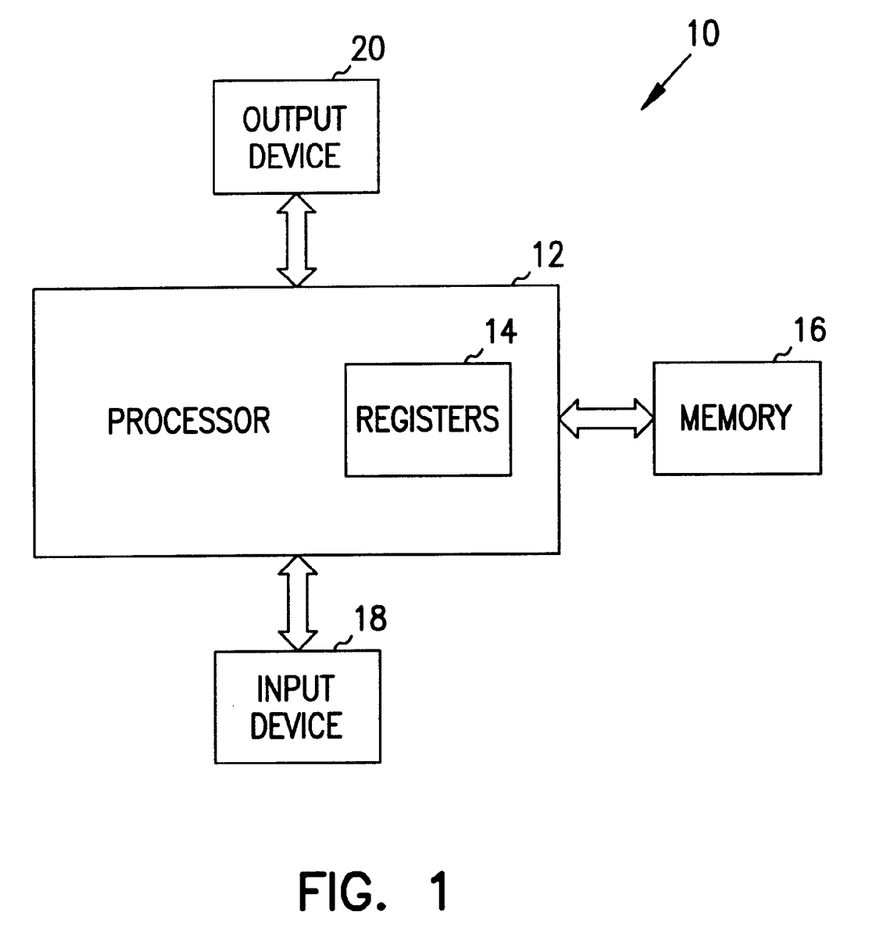
FIG. 1 is a block diagram of one embodiment of a compiler system.

A system for dynamically creating and updating control and data speculative recovery code during each phase of compilation, including the instruction scheduling phase, is shown in FIG. 1. In FIG. 1, compiler system 10 includes a processor 12 having a plurality of general purpose registers 14. Processor 12. is connected to memory 16, input device 18 and output device 20. Programs to be compiled are stored in memory 16 and are manipulated using input device 18. In one embodiment, input device 18 is a text entry device such as a keyboard or a disk drive. In another embodiment, device 18 is a pointing device such as a mouse. In yet another embodiment, an optical scanner or a microphone can be used to enter text or to point to items on the screen with the proper software.

In one embodiment, output device 20 is a display screen. Other ways of communicating with the user can also be used.

Figure 2:
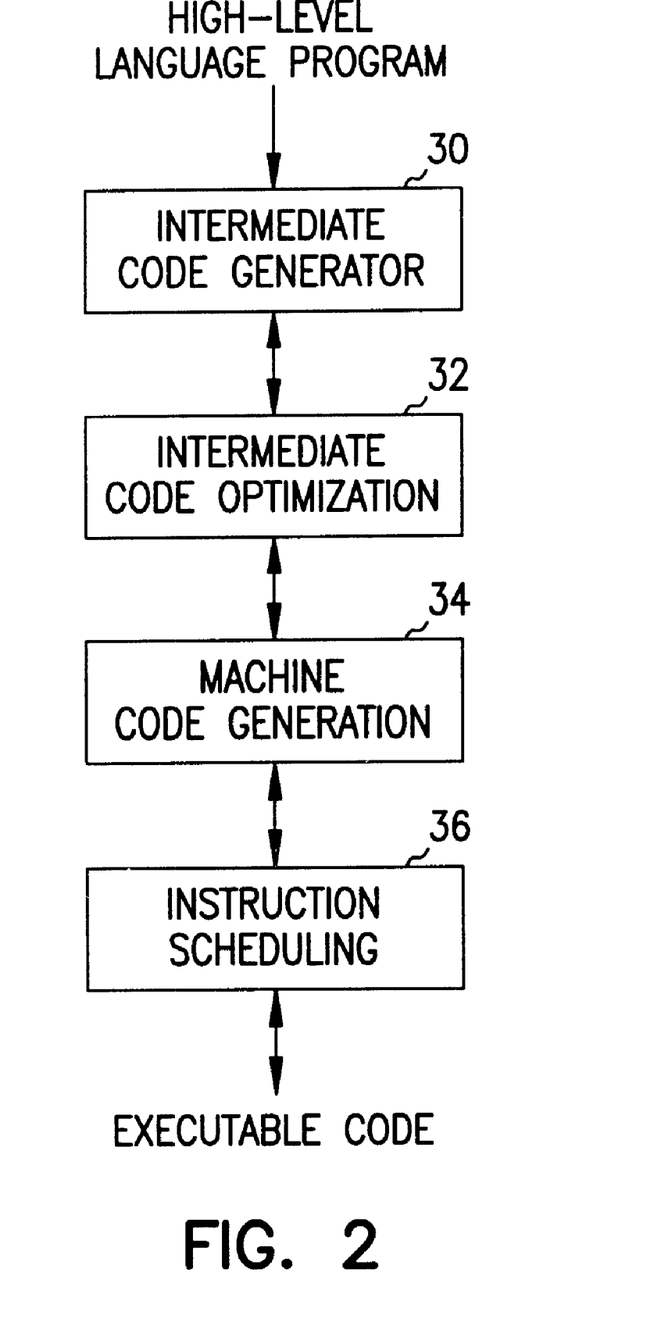
FIG. 2 illustrates one embodiment of a process for compiling source code into executable code.

A process for compiling a high-level language program is shown in FIG. 2. In FIG. 2, intermediate code is generated at 30 from the original source code. Generating intermediate code includes language parsing the program to construct an abstract representation of the program. At 32, the intermediate code is optimized in order to, for instance, reduce instruction counts and combine instructions. To this point, all operations on the high-level language program are machine-independent. The result is optimized, machine-independent code.

At 34, machine code is generated from the optimized, machine-independent code. At 36, instructions within the machine code are overlapped where possible and assigned to execution units. In addition, low latency instructions are hidden in the shadow of high latency instructions.

The compiler of system 10 provides a recoverable interval of instructions for the machine to execute in the case of failed speculation. In one embodiment, the compiler updates the instructions in this recovery code as it speculates loads and their subsequent uses. The bookkeeping to accomplish this is complicated; that is, not all uses of a speculative load may execute speculatively. Adding recovery code further complicates optimization in that it adds control flow to the optimization scope. This may prove too difficult or expensive to update for many optimizations since dependence information is built atop control flow information.

Problems faced by an instruction scheduler in the phase ordering of an advanced compiler exploiting speculation during many phases of optimization as well as the problems faced internal to the scheduler in creating and updating recovery code are detailed next.

First, control flow should stay constant. Explicit recovery code changes the control flow of the optimized program. Speculating a load then implies that control flow should be added to place the recovery code. This proves too difficult to update during most optimizations since dependence information is constructed in part from control flow information. Further more, the particular data flow representation may be too expensive to update incrementally when control flow changes.

Second, one should prohibit non-recoverable uses from speculating. Some uses of speculative loads cannot execute speculatively. That is, those instructions that do not constitute a recoverable interval cannot become a part of that interval. Such cases include stores, operations which redefine values live (i.e., still needed) into the recoverable interval, and instructions which define their own operands. The instruction scheduler should be aware when scheduling a use speculatively so that it can prohibit such motions, or in the case of register anti-dependencies, allow the scheduler to rename to break the false dependencies.

Third, one should deal with recovery code received from other optimization phases. To date, recovery code has been limited to its use within the instruction scheduler. This is not necessary. Instead, speculation checks and recovery code can be generated at many of the phases of compiling. For instance, recovery code could be generated as part of an optimization of intermediate code at 32 in FIG. 2. Speculation checks and recovery code may, therefore, come to the instruction scheduler from other phases in the compiler or from the scheduler itself in the case of a scheduler which may schedule the same code more than once.

Inheriting speculation checks and recovery code from other phases of the compiling process complicates the instruction scheduling analysis. For instance, a speculative load and the corresponding recovery check may be very far apart. One may be outside of the scheduling region and the other may be inside. This makes it difficult to know dependence relationships between speculative uses (i.e., uses of speculative values) and recovery checks since the original speculative load is outside our scope of analysis. This also applies for keeping multiple inter-dependent recovery checks in order for proper exception reporting. What is needed, therefore, is a model that not only can generate recovery code within a phase but which also can take recovery code from a previous phase or phases as input.

In one embodiment, recovery code from previous phases of the compiler are treated explicitly as control flow. Treating recovery code from previous phases as control flow is simpler to handle but tends to be very conservative. Most schedulers do not allow the reordering of control flow. That is, independent checks could not be reordered and checks could not move to speculative locations under non-speculative block predicates. This is usually done by using fully-resolved predicates on microprocessors which support conditionally executed instructions, such as predicated execution.

Figure 3:
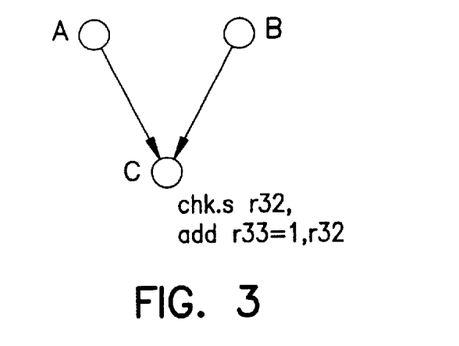
FIG. 3 illustrates movement of an instruction above a recovery check.

Fourth, one should update recovery code bookkeeping on fly. When an instruction moves above a recovery check which checks a value or propagated value which the moved instruction reads, it should be placed in the recovery code of that check. This is complicated in an arbitrary region instruction scheduler which schedules multiple paths at a time. The "add" in FIG. 3 may move above the "check" on path (A–C) and (B–C) and then the "check" may move to A and to B. Or, the "add" may move above the "check" on path (A–C) and then the "check" moves to A: (In the examples here and in FIGS. 7a and 7b, an instruction syntax such as "ld4.s" indicates control speculation and "chk.s" is a check on the control speculation.) And then the "check" moves to B and the "add" to B. To summarize the point, uses may move above recovery checks on only some of the paths on which the check is scheduled. This implies the recovery checks need to have full freedom of motion equal to any other instruction and that the recovery code is subject to the same rules of compensation.

Fifth, one would like to combine check instructions where possible to improve run-time performance. In one embodiment, processor 12 defers the reporting of an instruction generated exception to the point later in the program where the instruction would have been executed before it was speculated by the scheduler. Processor 12 also includes a check instruction which checks for the deferred exception and generates an actual exception if the speculated branch is actually taken. In one embodiment, processor 12 defines a "Not A Thing" (NAT) value which can be written into one of the general purpose registers 14. The NAT value is written into a control speculative load's result register if execution of that instruction causes an exception. When processor 12 reads a NAT value from one of the registers 14 in response to a check instruction, it knows that a deferred exception has occurred and it reacts accordingly.

System 10 provides a method and framework to solve the above problems. In the following discussion, an assumption is made that the reader is familiar with a path based global instruction scheduler that offers deferred compensation code placement. Only those details necessary to the scheduler to support recovery code placement and bookkeeping are, therefore, described.

Figure 4:
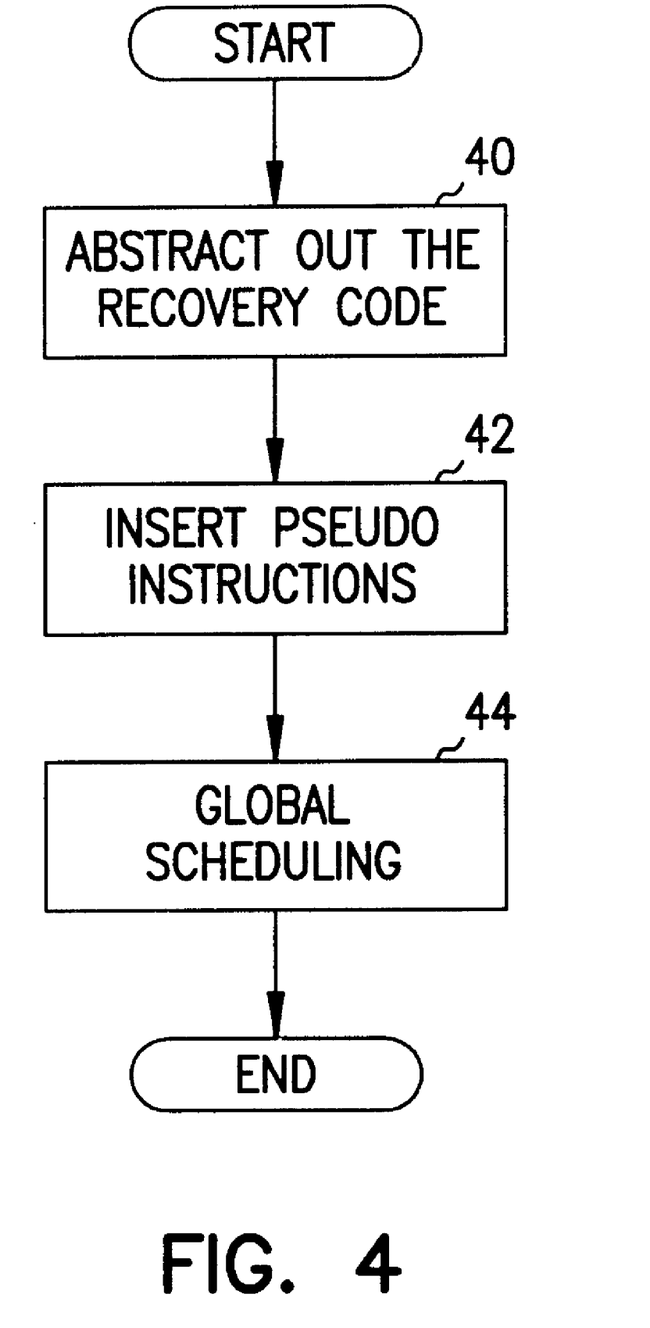
FIG. 4 illustrates one embodiment of a method for dynamically creating and updating control and data speculative recovery code during the instruction scheduling phase.

One embodiment of a method for dynamically creating and updating control and data speculative recovery code during the instruction scheduling phase is shown in FIG. 4. In FIG. 4, at 40 the compiler abstracts out the control flow properties of the speculation check and recovery code. In one embodiment, the compiler removes the recovery code from the control flow graph and places it into a recovery code database. The check instruction is then treated as any other non control flow instruction. That is, the checks are no longer branches to recovery code. Instead, all of the bookkeeping has been moved to an auxiliary structure outside of the abstract control flow representation.

Control then moves to 42, and pseudo instructions are placed around the check instruction. The pseudo instructions model the behavior of instructions in the recovery code. (A pseudo instruction is an instruction that requires no pipeline execution unit and exists merely to represent information.) In one embodiment, the following pseudo summary instructions are used:

recovery_use (List: register readers, Path: control flow paths)
  recovery_def (List: register readers/writers, Path: control flow paths)
  recovery_ld (List: memory reference handle, Path: control flow paths)

For every definition in the recovery code, a corresponding recovery_def is attached to the check instruction. For every use of a value in the recovery code, a corresponding recovery_use is attached to the check instruction. Likewise, for every load of a value in the recovery code, a corresponding recovery_ld is attached to the check instruction.

By attaching pseudo instructions representing recovery code behavior to each check instruction, the compiler makes explicit the dependencies due to the checks. At the same time, the compiler has eliminated a branch and simplified the control flow structure.

Control then moves to 44, where the instructions are scheduled as detailed below.

The above model for handling speculative checks and recovery code means that a compiler can now inherit speculative checks and recovery code from earlier phases of compiling. One embodiment of a method for scanning a routine for explicit recovery code (i.e., abstracting the recovery code) is shown in FIG. 5.

Figure 5:
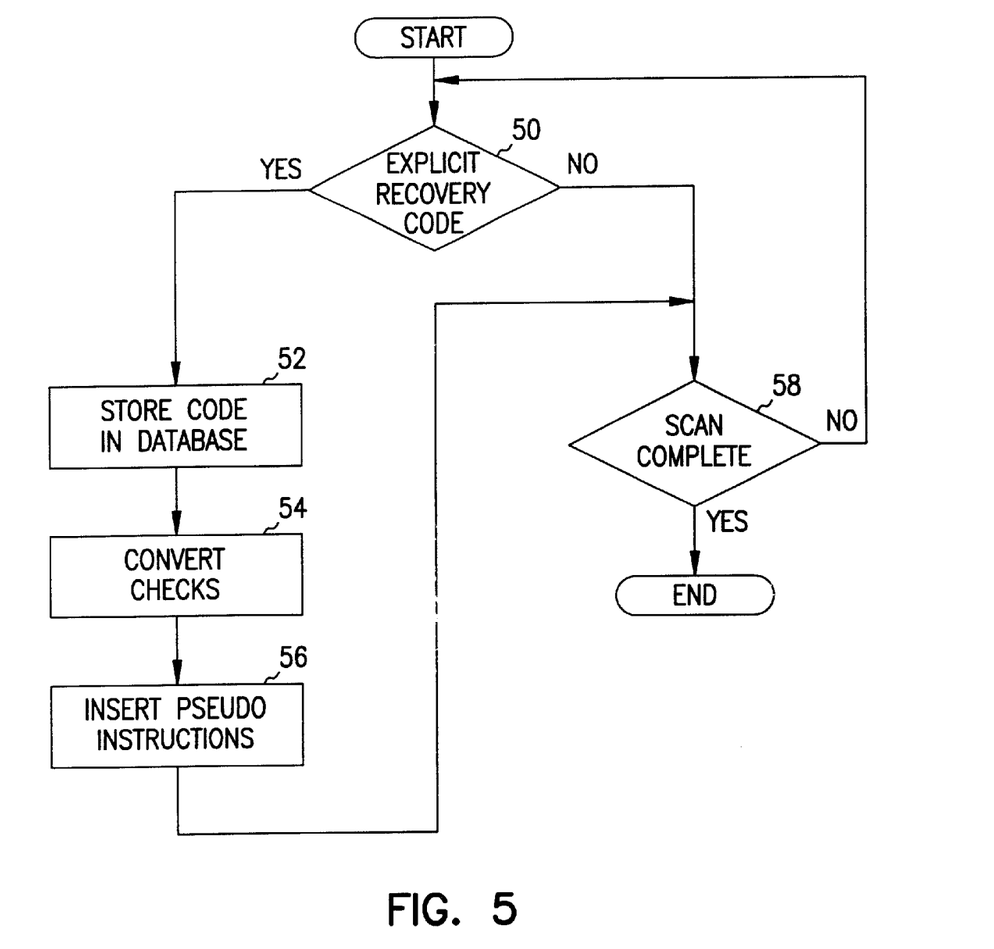
FIG. 5 illustrates one embodiment of a process for stripping explicit recovery code.

In FIG. 5, at 50 the entire routine is scanned for explicit recovery code. If explicit recovery code is found, control moves to 52 where the explicit recovery code is removed from the control flow graph and placed into a recovery database. In one embodiment, the recovery code is inserted into the database with its recovery check as the search key. The recovery checks are left in the graph and, at 54, converted into a non-control flow form of the check instruction. The control flow graph is repaired by removing the recovery code control flow from the flow graph and making the recovery check have only one successor instruction. The recovery checking instructions are then updated, at 56, with pseudo summary instructions that represent the data flow properties of the now hidden recovery code. For example, ld rm=[rx] //"input_ptr"
op rk=rz,rm
recuse=rx
recuse=rz,rm
chk.s __ld rm=[rx]
recld "input_ptr" __op rk=rz,rm
recdef rm=rm
recdef rk=rk The recovery use instruction (recuse) represents values live on entry into the recovery code. That is, this instruction represents the values that may not be redefined before the check is scheduled. The recovery definition instruction (recdef) represents the use of the speculative definitions on the path not thru the recovery code (i.e. the use in the recdef) and the possible redefinition of the speculative value in the recovery code (i.e. the def in the recdef). The recovery load instruction (recld) represents memory references that read memory locations in the recovery code. This is needed to represent anti-dependencies through memory since the original speculative load may need to be reloaded in the recovery code. Since stores and calls can never be executed speculatively, there is no need to offer a method-to represent them in the recovery. Each pseudo recovery instruction lies on a set of paths which may be a subset of the paths thru the block in which the pseudo instruction lies.

After all explicit recovery code has been removed from the machine code, the instruction scheduler begins to schedule and updates the recovery code database and the recovery summary pseudo instructions on the fly. In one embodiment, the instruction scheduler has the following qualities.

First, the instruction scheduler makes successors ready. When an instruction schedules, the instruction scheduler should test every dependent successor for readiness at the particular schedule point. In addition, if the dependent successor of a scheduled instruction is a recovery definition, then all the successors of the recovery definition should be tested for readiness at the point.

Second, the instruction scheduler tests for data readiness. For purposes of determining data readiness, the recovery definition instructions are ignored. That is, an instruction is not prohibited from becoming data ready just because an unscheduled recovery definition writes a value the instruction reads.

Third, the instruction scheduler determines if scheduling an instruction into a particular execution cycle would mean moving the instruction above a guarding check such that the instruction would execute before the check at run-time (i.e., crossing a check). For the purpose of determining when scheduling an instruction i at a particular block b means it will execute reading a speculative value (either control or data speculative), the instruction is said to be crossing a check when there exists some unscheduled dependence predecessor recovery definition which lies on a path thru the target block b.

Fourth, for purposes of determining speculative motion, any instruction crossing a check is treated as speculative. This prohibits any non-speculative instructions such as stores from executing with speculative operand values.

Fifth, recovery definitions and recovery use instructions are never scheduled explicitly. That is, the candidate selection mechanism never picks these to be scheduled. They are scheduled merely as a side effect of scheduling a recovery check instruction.

Finally, when an instruction is scheduled and it is crossing checks, the instruction scheduler updates the pseudo summary instruction information for each check the instruction is crossing. In order to do this, in one embodiment, the instruction scheduler adds a recovery use instruction with the same operands as the instruction being scheduled and with a control flow path defined as the intersection of the paths thru the recovery check and the paths thru the target block.

At the same time, the instruction scheduler creates a recovery definition instruction that has the same reader and writer for each of the crossing instruction's writers. The recovery definition lies on the same paths computed above for the recovery use instruction. If the crossing instruction is a memory reference, the instruction scheduler also adds a recovery load instruction on the same paths mentioned above.

Next, the instruction scheduler updates the recovery database by adding the instruction into the recovery code corresponding to the recovery check. Each instruction placed into the recovery database is also given the same control flow paths as for the recovery summary pseudo instructions.

Each recovery pseudo instruction explicit in the graph and the recovery code in the database is given a unique instruction value number. So when the instruction scheduler moves a compensation copy above a recovery check for the second time on a disjoint path from the first copy, the recovery use instructions should first be searched for the same value number. If the instruction scheduler finds a matching value number, it simply updates the paths on which the recovery use lies to include the new paths corresponding to the new instruction copy. This is done the same both for pseudo recovery definitions and for the recovery code stored in the database.

Code motion of recovery checks will be discussed next. While scheduling a check in a target block on a set of paths, the instruction scheduler also schedules the recovery use, recovery def, and recovery load instructions of that check whose paths intersect the paths thru the target block of the code motion. When code duplicating a recovery check, the instruction scheduler also duplicates the recovery code in the database. A new recovery check instruction is then created, entered into the database, and every recovery instruction corresponding to the original check which lies on a path thru the target code motion block is copied into the recovery code of the new check.

Figure 6:
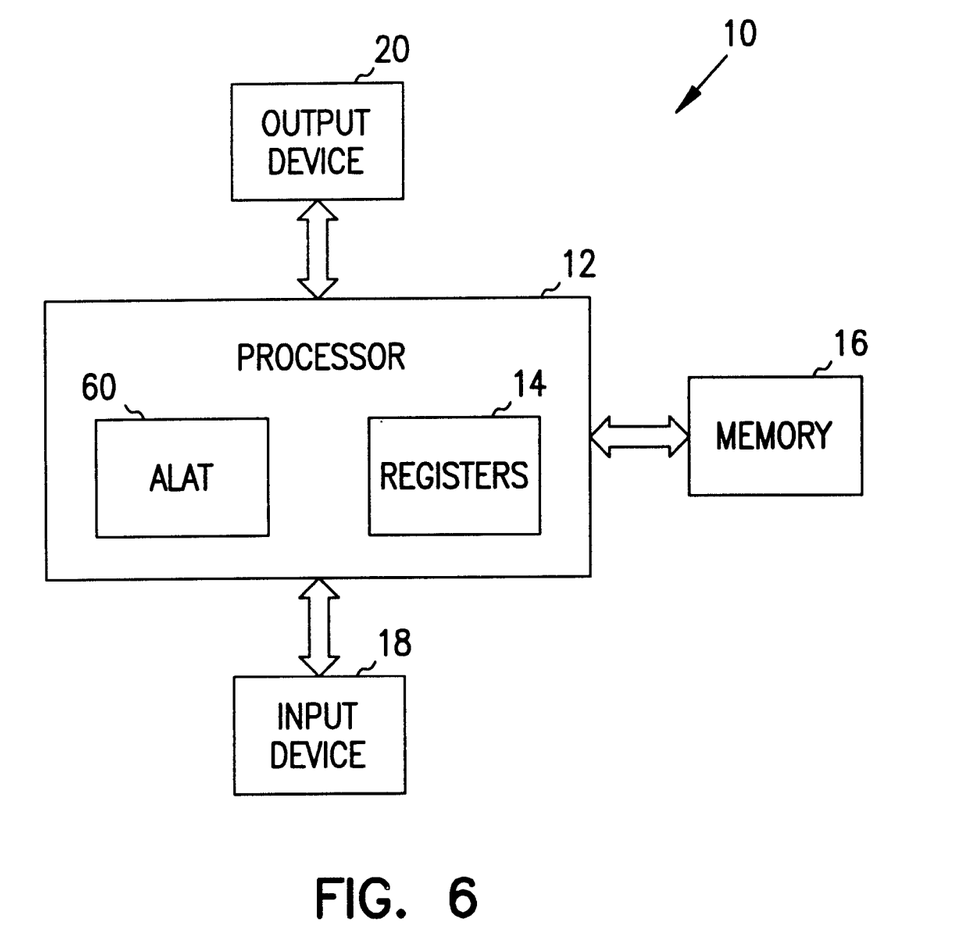
FIG. 6 is an alternate embodiment of the compiler system of FIG. 1.

In one embodiment, processor 12 includes an Advanced Load Address Table 60 (or ALAT). One such embodiment is shown in FIG. 6. Like Chen's MCB, ALAT 60 keeps the memory addresses of all the control speculation loads that have been executed. The addresses of any stores which occur after the load are compared against the table. If the address is in the table, the preload value is incorrect, the address is removed from the table and, when the check instruction determines the address is not in the ALAT, processor 12 executes recovery code to redo the load, re-execute all its uses and then branch back to where it left off. If, however, the check instruction finds the address in the ALAT, the preload was not knocked out by a subsequent store. The preload value was therefore correct and processor 12 can proceed with the speculated value.

In one ALAT embodiment, processor 12 includes two types of ALAT check instructions: clear and no-clear. The clear form of the ALAT check determines if the address is in the ALAT, and then removes it. The no-clear form of the ALAT check determines if the address is in the ALAT, and then leaves it there. The no-clear form of the ALAT check can be used, for example, when there is a speculative load outside a loop and a check inside the loop. In that case, one might want to check for the address each time you pass through the loop. So in that case, the compiler would not want to remove the address from the ALAT.

As noted above, one would like to combine checks when possible. This improves performance by reducing the number of checks that need to be executed at run-time. One problem with producing recovery code post pass is the lack of support for NAT propagation to eliminate checks. Supporting NAT propagation to eliminate checks cannot be done before scheduling since it is not known which loads will become speculative. Supporting NAT propagation to eliminate checks after scheduling is too late since the checks will already have been scheduled. A better approach is to identify and take advantage of the opportunity to combine checks through NAT propagation dynamically on a per path basis using the method to be described below.

As noted above, in one embodiment general purpose registers 14 are used to store control speculative loads. On those rare occasions when a run-time exception is generated by a speculative load, processor 12 writes a NAT value to the register 14 storing the speculative load. Then, when processor 12 reads a NAT value from one of the registers 14 in response to a check instruction, it knows that a deferred exception has occurred and it reacts accordingly.

In one such embodiment processor 12 ensures that operations having NAT values on inputs produce NAT values for the outputs. NAT values can, therefore, be propagated through the program in a data flow manner. This allows control recovery checks, and their corresponding recovery code intervals, to be combined when the speculative values they check meet together in some common operation that produces a third speculative value.

Figure 7A:
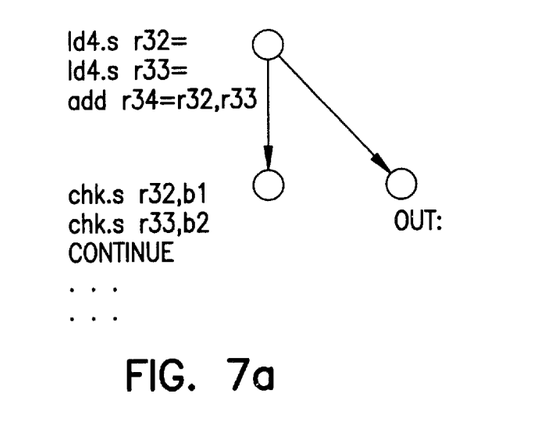
FIGS. 7a and 7b illustrate check combining through NAT propagation.

In the example shown in FIG. 7a, a system which does not support NAT propagation would have to perform a separate check on both the load to r32 and the load to r33 and would have to provide recovery code for each check. The recovery code might look like this:

b1:
   ld4 r32=
   add r34=r32,r33
   branch "continue"
b2:
   ld4 r33=
   add r34=r32,r33
   branch "continue"

In a system supporting NAT combining, the checks on r32 and r33 are combined into a single check:

chk.s r34, b3 with only a single section of recovery code:
b3:
   ld4 r32 =
   ld4 r33 =
   add r34=r32,r33
   branch "continue"

Control checks can also be combined when speculating a load that reads an already speculatively loaded value.

Figure 7B:
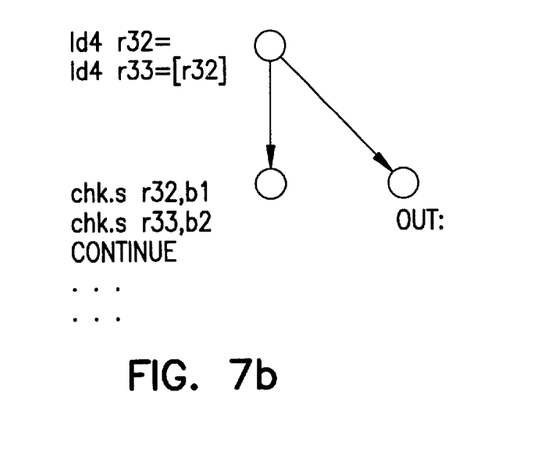

In the example shown in FIG. 7b, a system which does not support NAT propagation would have to perform a separate check on both the load to r32 and the load of the contents of r32 to r33. Again, recovery code would have to be provided for each check. The recovery code might look like this:

b1:
   ld4 r32 =
   ld4 r33=[r32]
   branch "continue"
b2:
   ld4 r33=[r32]
   branch "continue"

In a system supporting NAT combining, the checks on r32 and r33 are combined into a single check:

chk.s r33, b3 with only a single section of recovery code:
b3:
   ld4 r32=
   ld4 r33=[r32]
   branch "continue"

An implementation of recovery code generation should support both of the above slightly different cases of check combining.

An added benefit of the recdef on each check is that it makes explicit those values defined which either immediately or ultimately read the original speculative load that the check guards. The insight is that since recdefs are modeled as read and written, those checks which can be propagated together are merely those checks which are connected via the web of recovery definitions for a particular value. So after a check is scheduled, the recdefs are searched one at a time. When one of the check's recdefs defines a value which has a second check's recdef as a reader and that second check's recdef has the same value number, that check may be combined with the scheduled check on the paths they have in common. This may result in the check being completely or only partially subsumed by the scheduled check. Since checks can be partially subsumed, a control check could be combined with a different control speculative check for each path on which it is to be scheduled.

Figure 8A:
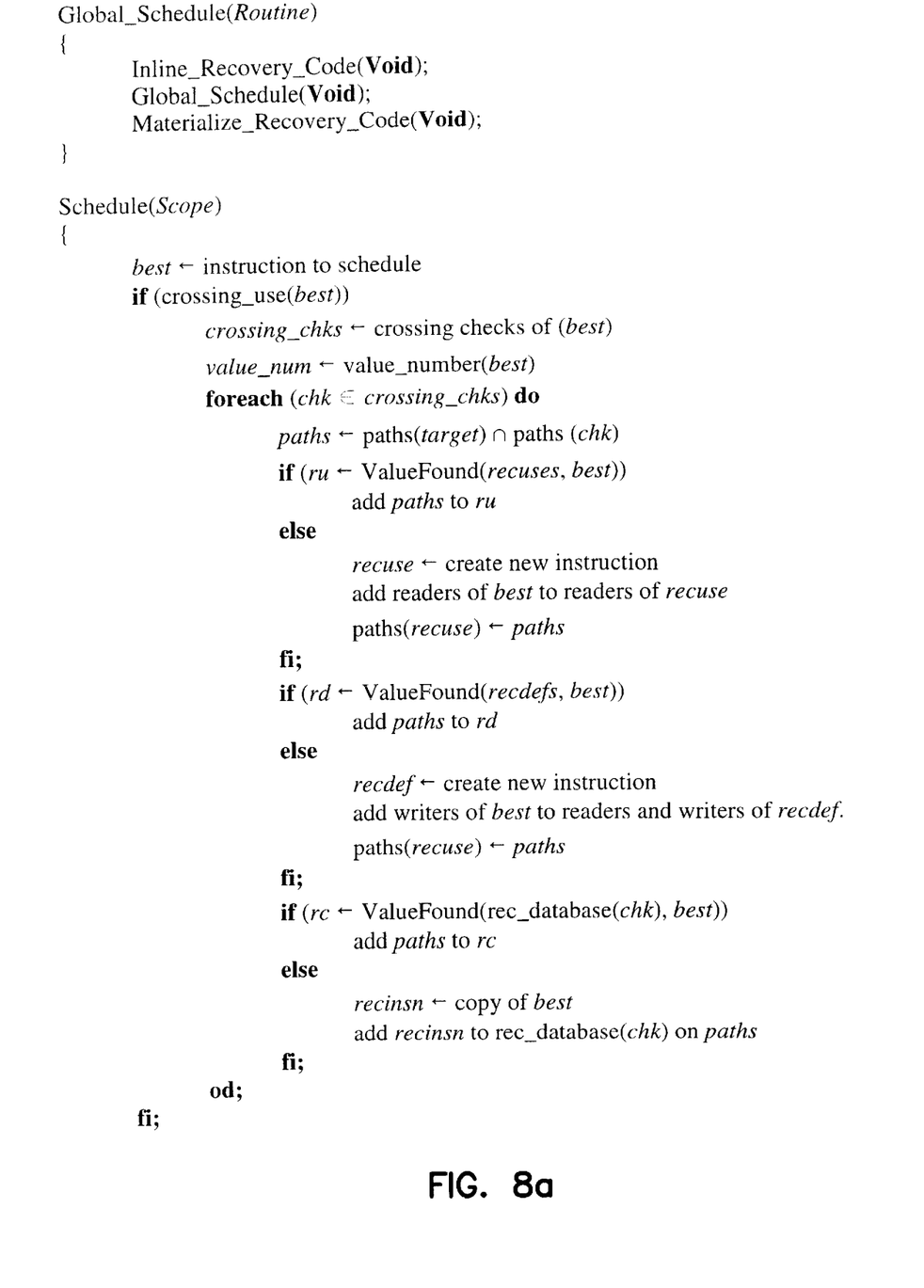
FIGS. 8a and 8b are more detailed pseudo code representations of the process of FIG. 2.
Figure 8B:
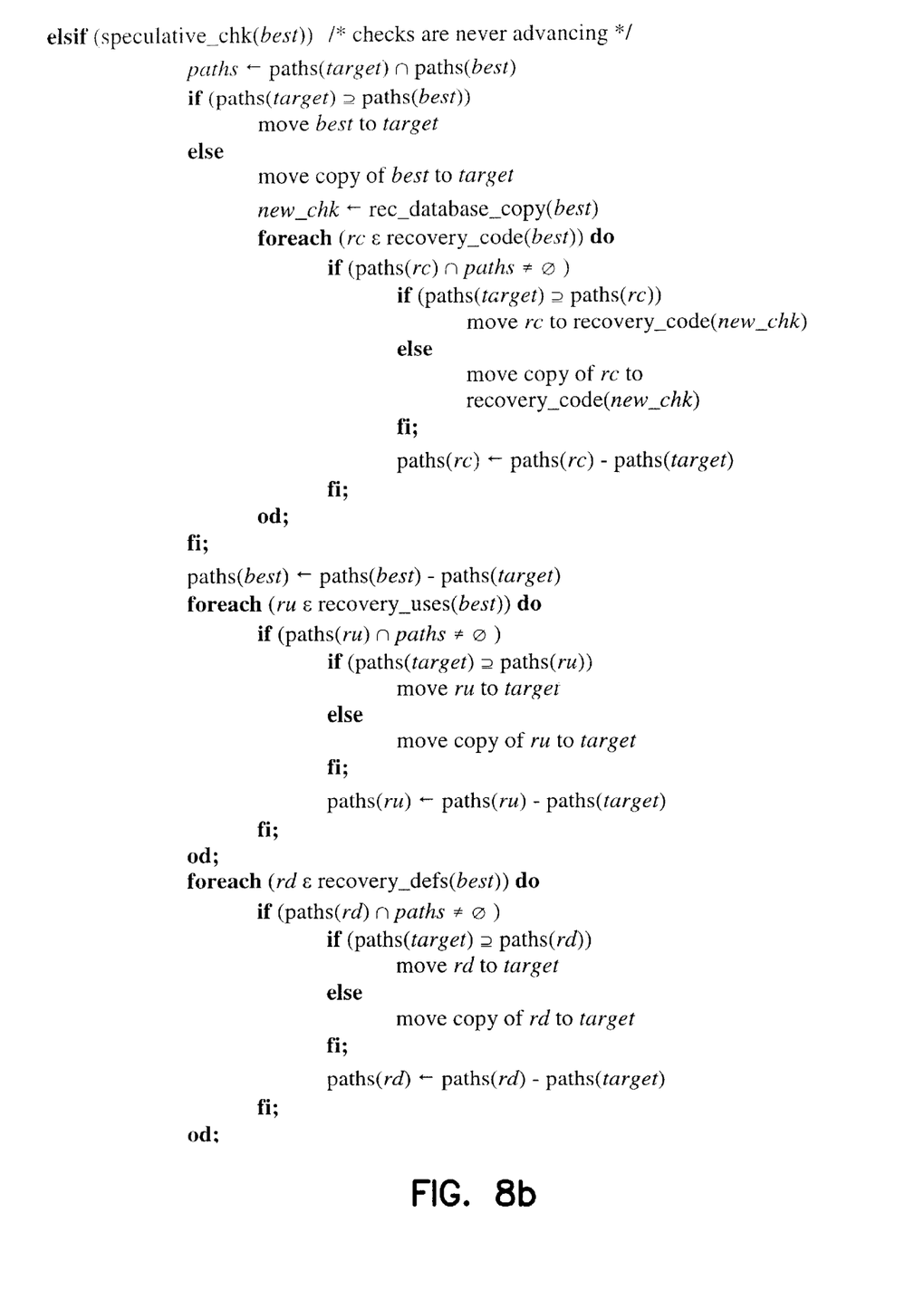

Once global scheduling is complete, the only thing remaining to be done is to materialize the recovery code and update the control flow graph. The compiler simply scans the routine, turning the non-control flow form of recovery checks into control flow forms, adding recovery blocks to the flow graph, instrumenting the recovery code from the database into those recovery blocks, and updating the control flow edges. A pseudo code representation of this algorithm is shown in greater detail in FIGS. 8a and 8b.

A system and method has been described for dynamically creating and updating control and data speculative recovery code during each phase of compilation, including the instruction scheduling phase. This method also allows already existing speculative checks and their recovery code freedom of motion during scheduling while still encapsulating the necessary data flow information to enable continual update of the recovery code.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of compiling source code, comprising:
   generating intermediate code from the source code;
   generating object code instructions from the intermediate code;
   scheduling the object code instructions, wherein scheduling includes:

inserting a speculation check;

storing recovery code associated with the speculation check; and generating a control flow graph, wherein generating a control flow graph includes converting the speculation check to a non-flow control check instruction, attaching one or more pseudo instructions to the check instruction and converting the non-flow control check instruction to a flow control check instruction;

wherein the pseudo instructions represent recovery code behavior for the recovery code associated with the check instruction.

2. The method according to claim 1, wherein converting the non-flow control check instruction to a flow control check instruction includes:

adding recovery blocks to the control flow graph;

instrumenting the recovery code from the database into the recovery blocks; and updating control flow edges.

3. The method according to claim 1, wherein scheduling the object code further includes performing control speculation loads.

4. The method according to claim 1, wherein scheduling the object code instructions further includes:

inserting a NAT in a register during a preload; and propagating the NAT.

5. A method of compiling source code, comprising:

generating intermediate code from the source code, wherein generating intermediate code includes generating intermediate level recovery code associated with data speculation;

generating object code instructions from the intermediate code;

scanning the object code instructions to find speculation checks and recovery code;

converting flow control speculation checks to non-flow control check instructions; and attaching pseudo instructions to the check instructions, wherein the pseudo instructions represent recovery code behavior for the recovery code associated with the check instruction; and scheduling the object code instructions, wherein scheduling includes generating a control flow graph.

6. The method according to claim 5, wherein converting flow control speculation checks to non-flow control check instructions in includes storing recovery code into a database and wherein scheduling further includes:

turning each non-flow control check instruction into a control flow check instruction;

adding recovery blocks to the control flow graph;

instrumenting the recovery code from the database into the recovery blocks; and updating control flow edges.

7. The method according to claim 5, wherein scheduling the object code instructions further includes inserting an object code speculation check in the object code instructions and storing recovery code associated with the object code speculation check; and wherein generating a control flow graph, wherein generating a control flow graph includes converting each object code speculation check to a non-flow control check instruction, attaching one or more pseudo instructions to the object code check instruction, converting the non-flow control check instruction to a flow control check instruction, adding recovery blocks to the control flow graph, instrumenting the recovery code from the database into the recovery blocks and updating control flow edges.

8. The method according to claim 5, wherein scheduling the object code includes performing control speculation loads; and wherein generating recovery code includes modifying the object code instructions associated with the intermediate level recovery code as a function of the control speculation loads.

9. The method according to claim 5, wherein scheduling the object code instructions includes inserting a NAT in a register during a preload and propagating the NAT.

10. A method of compiling source code, comprising:

generating intermediate code from the source code; and generating object code from the intermediate code, wherein the object code includes a plurality of object code instructions and wherein generating object code includes:

placing the object code instructions in an execution order;

reviewing the object code instructions for instructions that can be executed out of order, wherein reviewing includes identifying a first instruction which can be moved earlier in the execution order;

inserting a check instruction in place of the first instruction;

moving the first instruction to an execution location earlier in the execution order;

identifying a second instruction, wherein the second instruction is an instruction which could be incorrectly executed due to the movement of the first instruction; and storing the second instruction as object code recovery code, wherein storing the second instruction includes placing the second instruction in a database at a location associated with the check instruction.

11. The method according to claim 10, wherein the intermediate code includes a plurality of intermediate code instructions, wherein generating intermediate code includes:

placing the intermediate code instructions in an execution order;

reviewing the intermediate code instructions for instructions that can be executed out of order, wherein reviewing includes identifying a first intermediate code instruction which can be moved earlier in the execution order;

inserting a check instruction in place of the first intermediate code instruction;

moving the first intermediate code instruction to an execution location earlier in the execution order;

identifying a second intermediate code instruction, wherein the second intermediate code instruction is an instruction which could be incorrectly executed due to the movement of the first intermediate code instruction; and storing the second intermediate code instruction as intermediate code recovery code; and wherein generating object code from the intermediate code further comprises generating object code representative of the intermediate code recovery code.

12. A method of compiling source code, comprising:

generating intermediate code from the source code, wherein generating intermediate code includes:

generating a speculation check; and generating recovery code associated with the speculation check;

generating object code from the intermediate code, wherein the object code includes a plurality of object code instructions and wherein generating object code includes:

generating recovery code object code instructions from the recovery code;

placing the recovery code object code instructions in an execution order;

reviewing the recovery code object code instructions for instructions that can be executed out of order, wherein reviewing includes identifying a first instruction which can be moved earlier in the execution order;

inserting a check instruction in place of the first instruction;

moving the first instruction to an execution location earlier in the execution order;

identifying a second instruction, wherein the second instruction is an instruction which could be incorrectly executed due to the movement of the first instruction; and storing the recovery code object code instructions in a memory location, wherein the memory location is associated with the speculation check, wherein storing the recovery code includes storing the second instruction.

13. A compiler for compiling source code, comprising:

a processor having a plurality of general purpose registers;

a memory;

an input device; and an output device;

wherein the processor operates under program control to generate object code instructions from the source code and schedules the object code instructions, wherein the processor further operates under program control to insert a speculation check into the object code instructions, write recovery code associated with the speculation check into a database stored in the memory and generate a control flow graph, wherein generating a control flow graph includes converting the speculation check to a non-flow control check instruction and attaching one or more pseudo instructions to the check instruction and converting the non-flow control check instruction to a flow control check instruction;

wherein the pseudo instructions represent recovery code behavior for the recovery code associated with the check instruction.

14. The compiler according to claim 13, wherein converting the non-flow control check instruction to a flow control check-instruction includes adding recovery blocks to the control flow graph, instrumenting the recovery code from the database into the recovery blocks and updating control flow edges.

15. The compiler according to claim 13, wherein the processor includes a NAT value and means for propagating the NAT value.

16. The compiler according to claim 13, wherein the processor includes an advanced load address table, wherein the advanced load-address table stores addresses associated with data speculative loads.

17. A computer-readable medium, comprising:

program code for generating intermediate code from the source code;

program code for generating object code instructions from the intermediate code;

program code for scheduling the object code instructions, wherein the program code for scheduling includes:

program code for inserting a speculation check;

program code for storing recovery code associated with the speculation check; and program code for generating a control flow graph, wherein the program code for generating a control flow graph includes program code for converting the speculation check to a non-flow control check instruction, for attaching one or more pseudo instructions to the check instruction and for converting the non-flow control check instruction to a flow control check instruction;

wherein the pseudo instructions represent recovery code behavior for the recovery code associated with the check instruction.

18. The computer-readable medium according to claim 17, wherein the program code for converting the non-flow control check instruction to a flow control check instruction includes program code for adding recovery blocks to the control flow graph, for instrumenting the recovery code from the database into the recovery blocks and for updating control flow edges.

19. The computer-readable medium according to claim 17, wherein the program code for scheduling the object code instructions further includes program code for inserting a NAT in a register during a preload and for propagating the NAT.

* * * * *